United States Patent Office 3,526,527
Patented Sept. 1, 1970

3,526,527
PROCESS OF FORMING A CATHODO-LUMINESCENT SCREEN
Anthony V. Gallaro, Auburn, and Walter F. Kazuk and Kenneth Speigel, Seneca Falls, N.Y., assignors to Sylvania Electric Products Inc., a corporation of Delaware
Filed Apr. 28, 1967, Ser. No. 634,724
Int. Cl. H01j 31/20
U.S. Cl. 117—33.5                                      3 Claims

ABSTRACT OF THE DISCLOSURE

A process of forming a plural color cathodoluminescent screen wherein at least two layers of light-emitting phosphors have therebetween a separation layer of electrically conductive oxide material that is substantially translucent to electromagnetic radiation and substantially opaque to the penetration of electron beams of predetermined velocity. The process of forming the screen includes a nucleation to achieve the uniform disposition of an oxidizable metal which when subsequently heated forms the metallic oxide of the separation layer.

BACKGROUND OF THE INVENTION

This invention relates to beam penetration types of cathodoluminescent color screens and a process for making the same and more particularly to screens having different layers of color-emitting phosphors excited by electron beams of differing velocities.

It is common in beam penetration multilayer cathodoluminescent screens to utilize a separation layer between adjacent phosphor layers to limit the penetration of electron beams of predetermined velocity. Conventional electron energy absorbing materials used in such separation structures include depositions of metals such as aluminum and magnesium and of nonconductive substances, as for example, mica and silicon dioxide. Certain disadvantages have been noted in screens employing such separation or barrier layers, for instance, metal deposits of specific thicknesses sufficient to control the penetration by electron beams of predetermined velocities usually exhibit a degree of opacity which limits translucency to electromagnetic radiation. On the other hand, nonconductive silicon dioxide which is substantially translucent to light energy, in addition to being difficult to uniformly deposit, manifests an undesirable dielectric property which momentarily retains an electron charge at the point of beam impingement. For example, the electron charge retention characteristic of the silicon dioxide layer slightly prolongs the excitation of the phosphor distal to the beam source and temporarily imparts color impurity to the color emission of the lower velocity excitable phosphor proximal to the beam source.

OBJECTS AND SUMMARY OF THE INVENTION

It is an object of the invention to reduce the aforementioned disadvantages and provide an improved beam penetration type of cathodoluminescent screen and a process for making the same.

Another object is to provide a beam penetration screen that exhibits improved color purity of the low velocity beam excited color emission.

A further object is the provision of a beam penetration screen having a separation layer therein of improved uniformity.

An additional object is to provide an improved method of fabricating a beam penetration type of multilayer cathodoluminescent screen.

The foregoing objects are achieved in one aspect of the invention by the provision of a cathodoluminescent screen having therein at least two layers of energy emitting phosphor materials with a uniform separation layer disposed therebetween. Such separation layer is of an electrical conductive oxide susbtance that is nondeleterious to the adjacent phosphor materials while exhibiting opacity to a predetermined level of discrete phosphor excitation energy and transluency to electromagnetic radiation. This screen is fabricated by a process wherein a layer of heat decomposable material is disposed over a first phosphor material. A nucleate of metal molecules dispersed thereover enhances the deposition of a uniform coaitng of an oxidizable metal thereover. The application of heat to the partial screen structure volatilizes the heat decomposable material and oxidizes the metal coating to form the aforementioned separation layer. The second phosphor material is applied thereover.

DESCRIPTION OF THE PREFERRED EMBODIMENT

Figure 1:
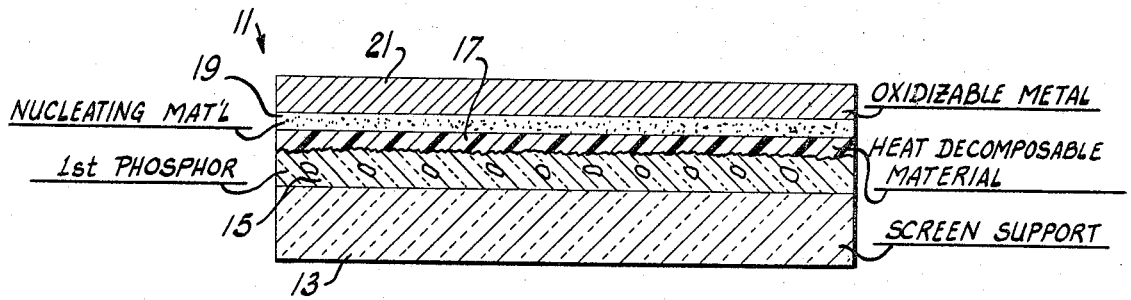
FIG. 1 is a cross-sectional view illustrating a partially formed cathodoluminescent screen structure.

For a better understanding of the present invention, together with other and further objects, advantages and capabilities thereof, reference is made to the following specification and appended claims in connection with the aforedescribed drawing.

With reference to the figures, there is shown a partially formed luminescent screen structure 11 which is formed on a substantially transparent support medium 13 such as a glass substrate or the inner surface of a cathode ray tube face plate. The screen utilizes a plurality of phosphors, of which at least one is responsive to electron excitation. Additionally, a screen of this type may also include one or more phosphors that are responsive to electromagnetic radiation emitted by a related electron responsive phosphor. The process of forming the screen comprises the application of a layer of a first phosphor material 15 which is substantially translucent and capable of energy emission upon excitation. This phosphor is disposed on the support medium by one of several conventional techniques such as for example by the settling of phosphor through a liquid cushion. Due to the range of phosphor particle sizes comprising the first phosphor layer, a somewhat roughened surface results. It is important that the separation or barrier layer 25, which is subsequently formed thereover, has a uniform thickness; therefore, a layer of a heat decomposable material is applied in a conventional manner thereon to fill in the rough topography of the phosphor layer and provide a smooth surface thereover. Suitable heat decomposable materials may be lacquer solutions such as methyl methacrylate dissolved in toluene which is appropriate for spray application or nitrocellulose dissolved in amyl acetate which is suitable for float type application. Upon drying, the lacquer film provides a smooth base on which the separation layer 25 is formed.

It has been found that a nucleation applied in the form of a dispersion of metal molecules enhances the adherence and uniform deposition of a compatible metal disposed thereover. The nucleated material 19, being a very thin dispersion or molecular film, provides micrscopic "islands" which promote uniform adherence of the sequentially applied compatible coating of oxidizable metal 21 vaporized thereon.

Figure 2:
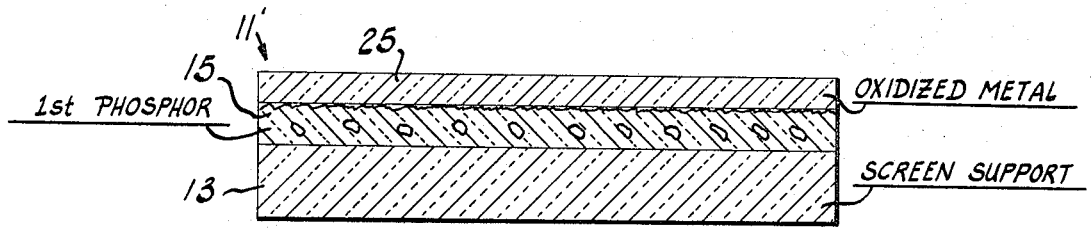
FIG. 2 is a cross-sectional view showing the screen structure of FIG. 1 after the baking step in screen processing.

Heating of the screen support medium and the aforedescribed partially formed screen thereon is consummated at a time-temperature relationship that is not deleterious to the phosphor materials therein, but sufficient to volatilize and remove the heat decomposable material and convert the oxidizable metal to oxide forming the separation layer 25. The metal oxide thus formed exhibits electrical conductivity, opacity to discrete phosphor excitation energy of a substantially predetermined level and translucency to electromagnetic radiation impinged thereon. As used herein, the designation "electromagnetic radiation" is intended to include the scope of the electromagnetic spectrum extending from gamma rays through infrared radiation. FIG. 2 illustrates the partial screen structure 11' after heating, which embodies the first phosphor and the separation layer of oxidized metal. Subsequently, a second phosphor material, capable of energy emission upon excitation, is disposed upon the separation layer by a technique conventional to the art.

In greater detail, a luminescent screen such as a cathodoluminescent screen having at least two electron responsive phosphors therein, as utilized in a plural color cathode ray tube, will be described along with a process for fabricating the same. The aforerecited process as shown in FIGS. 1 and 2 is likewise applicable in this instance for disposing the screen directly on the face panel surface of the tube.

Figure 3:
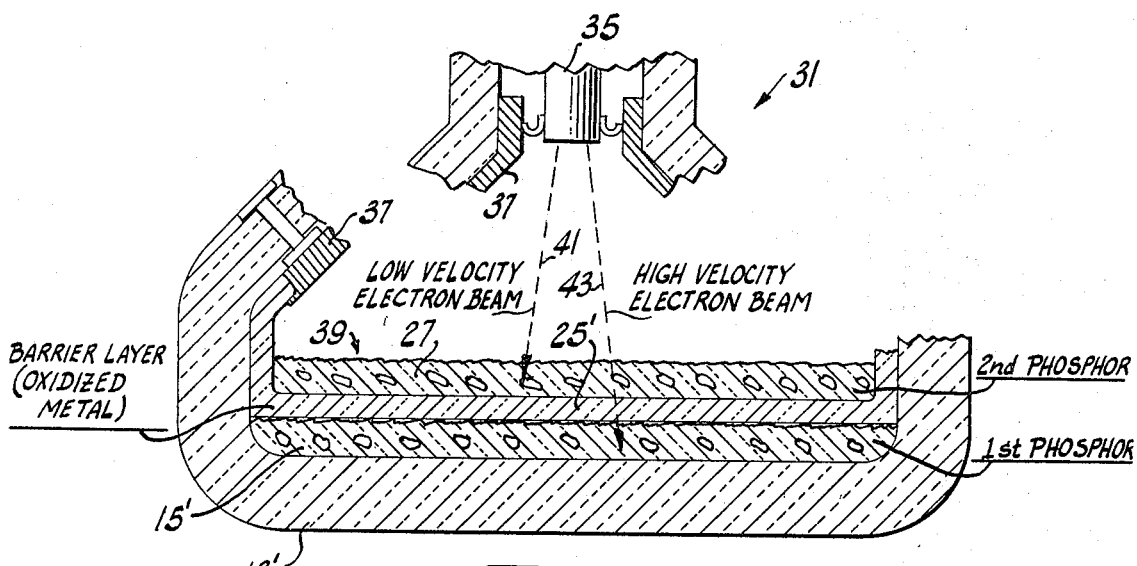
FIG. 3 is a fragmentray cross-sectional view of a cathode ray tube wherein the screen structure of the invention is formed on the inner surface of the viewing panel.

With reference to FIG. 3, a cathode ray tube 31 is partially shown wherein means 35 for generating electron beams of predetermined velocities is shown. This source of beams comprises one or more electron guns oriented in spaced relationship to the improved beam penetration type cathodoluminescent screen 39 which is formed on the inner surface of the tube face panel 13'. When a single gun beam source is employed, anode switching means is utilized to provide beams of differing velocities, whereas in a plural gun source, separate guns emanate low and high velocity beams respectively.

The first disposed phosphor layer 15' is in the form of an electron responsive color-emitting material such as the E.I.A. P-1 phosphor ($Zn_2SiO_4:Mn$) which is a green-emitting medium persistence material. This phosphor is disposed on the panel at a density range, in this instance, of approximately 3 to 5 mg./cm.$^2$. Next, one of the aforementioned lacquer materials is spray disposed thereover and the nucleate dispersed by vaporization thereon. The dispersion of the nucleate is of a minute thickness not deleterious to the translucency of the subsequently formed separation layer. It has been discovered that a suitable nucleating material is in the form of a metallic element requiring a vaporization temperature of at least 500 degrees centigrade to consummate the evaporation thereof at a pressure of $10^{-4}$ torr. Such metals include, for example, silver, tin, aluminum, and chromium. In this embodiment, a molecular dispersion of vaporized aluminum utilized as the nucleating material.

Upon the nucleate, a uniform coating of at least one metallic element selected from Groups 1b to 4a inclusive of Periods IV and V of the Periodic Table of Elements is vaporized thereon. Elements in these designations have oxide forms that are electrically conductive, translucent to light energy and exhibit opacity to electron beams of predetermined velocities in relationship to the thickness of the oxide layer. One of the Period V elements is, for example, cadmium which is utilized as the evaporated metallic coating in this embodiment of the invention. The partially formed screen structure is heated to approximately 400 degrees centigrade for a time period of about forty-five minutes to remove the lacquer material by volatilization and convert the cadmium deposition to a continuous separation layer 25' of electrically conductive cadmium oxide having a uniformity of thickness. In this instance, the thickness of the cadmium oxide is in the order of 900 angstroms. The temperature of the heating is not deleterious to the P-1 phosphor contained in the screen. It will be noted that the cadmium oxide separation layer 25' extends partially on the wall of the tube due to the deposition of the basic materials; i.e., the lacquer being spray applied and the nucleated aluminum and cadmium being vaporized thereon.

A layer of a second electron responsive phosphor 27 such as E.I.A. P-22 R.E.Red ($YVO_4:Eu$), a high efficiency red-emitting phosphor, is disposed in a conventional manner over the separation layer and is of a susbtantially uniform density within the range of approximately 1 to 3 mg./cm.$^2$. A conductive coating 37, such as aquadag applied to the funnel and neck portions of the tube, makes contact with the separation layer and provides the anode connective path. The cathodoluminescent screen so described provides an outstanding two color display, the specific phosphors being excited to color emission by electron beams of different velocities.

The low velocity electron beam 41, emanating from the beam generating source, is in this instance in the order of 6 kv. which excites the second or red-emitting phosphor 27 to bright color emission but has insufficient velocity to penetrate through the separation layer 25'. The luminous red emission thus produced traverses the optically translucent separation layer and the optically translucent P-1 phosphor to be visible as a bright red display to the observer viewing the face panel of the tube.

The high velocity beam 43 being, for example, in the order of 12 kv. excites the second or red-emitting phosphor and is of sufficient velocity to traverse the separation layer and excite the first or green-emitting phosphor layer disposed on the face panel. Since, in this instance, it is desired that a green color be observed as a result of high velocity beam excitation, the first or green-emitting phosphor is disposed in an amount to insure predominance of the green emission over the red therebeneath when the two are coincidently excited by a common beam. Thus, from the viewpoint of the observer, distinct bright red and bright green displays are produced by the low and high velocity beams respectively. If the two beams are generated and directed to simultaneously impinge upon contiguous screen areas, a bright complementary color combination results.

The composition of the substantially translucent and electrically conductive separation or barrier layer 25' is important as the conductivity characteristic thereof readily dissipates the beam impingement charge thereon and provides two-fold results not evidenced in nonconductive capacitance prone separators. Firstly, the spot size of the red and green color emissions are both of a size smaller due to the absence of the capacitance characteristic which normally tends to retain some of the electron charge at the point of beam impingement causing the beam spot to "bloom." Secondly, when a beam is switched from high velocity to low velocity operation, the electron charge at the point of impingement is dissipated so that there is no deleterious carry-over of green excitation and emission to momentarily lend color impurity to the desired red emission from the second phosphor layer. Hence the beneficial characteristics of the cadmium oxide separation layer relate to its translucency which readily conveys the luminescent brightness of the second phosphor layer, and to its conductivity which improves small spot size of both phosphor emissions and color purity of the luminescence emitted by the second or red-emitting phosphor.

Thus, there is provided a beam penetration type of cathodoluminescent screen that exhibits improved brightness and color purity heretofore sought but not previously evidenced in the beam penetration type of screen. The described process advantageously facilitates the uniform deposition of the improved separation layer and expedites fabrication of the subject screen.

While there has been shown and described what is at present considered the preferred embodiment of the invention, it will be obvious to those skilled in the art that various changes and modifications may be made therein without departing from the scope of the invention as defined by the appended claims.

We claim:
1. A process of fabricating a multi-layer cathodoluminescent screen on a supporting surface whereupon at least two layers of different light-emitting phosphor materials are disposed with a separation layer therebetween, said screen forming process comprising:

applying a first phosphor material on said screen supporting surface;

applying a layer of a heat decomposable lacquer material over said first phosphor material to provide a smooth surface thereover;

vaporizing a discrete molecular dispersion of islands of metal molecules on said heat decomposable lacquer layer to provide a nucleation thereon, said nucleation material being at least one selected from the group consisting of aluminum, silver, tin, and chromium, and being vaporized as a minute thickness not substantially deleterious to the translucency of said subsequently formed separation layer;

applying a uniform coating of an oxidizable metal on said nucleated surface to provide the material necessary for the subsequent formation of said separation layer, said oxidizable metal being at least one metallic element selected from Groups 1b to 4a inclusive of Periods IV and V of the Periodic Table;

heating said several layers of the partial screen structure at a time-temperature relationship not deleterious to said first phosphor material but sufficient to volatilize said heat decomposable lacquer material therefrom and to oxidize said metal coating to form an electrically conductive oxide separation layer nondeleterious to said adjacent phosphor materials, opaque to a predetermined level of phosphor excitation energy and substantially translucent to electromagnetic radiation; and applying a second phosphor material on said formed separation layer to provide said multilayer screen.

2. The process of fabricating a cathodoluminescent screen according to claim 1 wherein said nucleation materials require a vaporization temperature of at least 500 degrees centigrade to consummate the evaporation thereof at a pressure of $10^{-4}$ torr.

3. A process of fabricating a cathodoluminescent screen according to claim 1 wherein said oxidizable metal is cadmium and wherein said heating of said partial screen is consummated in a controlled atmosphere at a temperature of substantially 400 degrees centigrade for a time period sufficient to volatilize and remove said heat decomposable material and convert said cadmium to form said electrically conductive separation layer of cadmium oxide.

References Cited

UNITED STATES PATENTS

| 2,756,167 | 6/1956 | Barnett | 117—33.5 XR |
| 2,842,463 | 7/1958 | Bond et al. | 117—107 XR |
| 3,294,569 | 12/1966 | Messineo et al. | 117—33.5 |
| 3,333,984 | 8/1967 | Kaspual et al. | 117—107 XR |

ALFRED L. LEAVITT, Primary Examiner

W. F. CYRON, Assistant Examiner

U.S. Cl. X.R.

117—46, 107